METHOD OF MAKING A MAGNETIC MEMORY ARRAY

Original Filed Nov. 2, 1962

LEONARDO DIMATTEO

LEONARDO DiMATTEO

United States Patent Office 3,382,571

Patented May 14, 1968

3,382,571

METHOD OF MAKING A MAGNETIC MEMORY ARRAY

Leonardo Di Matteo, Clawson, Mich., assignor to Ex-Cell-O Corporation, Detroit, Mich., a corporation of Michigan Original application Nov. 2, 1962, Ser. No. 234,940, now Patent No. 3,237,174, dated Feb. 22, 1966. Divided and this application May 13, 1965, Ser. No. 464,265

9 Claims. (Cl. 29—604)

ABSTRACT OF THE DISCLOSURE

This invention relates to a process for manufacturing magnetic cores. The process provides for regularly and uniformly stringing insulated drive and sense conductors on a non-conductive frame using conductive pins as terminals. A thin sheet of magnetic material is placed on one side of the conductors and contacts the adjacent one. Then the conductors are completely embedded within a magnetic material which is electrolytically deposited. Two protective maskings are placed in alignment on the opposite sides of the magnetic materials and registered with the junctures of the conductors. The entire assembly is placed in an etching solution to remove all the unmasked magnetic material from the assembly. The assembly is then a finished article with the option of leaving the frame as a permanent part of the assembly or the assembly or the conductors may be cut to provide an independent assembly with the further option of separating the cores from the assembly into separate articles.

This application is a division of application Ser. No. 234,940 filed Nov. 2, 1962, now Patent Number 3,237,174.

This invention relates to magnetic storage devices, and more particularly, to printed circuit magnetic core memory matrices, and the like, and to the process of manufacturing the same.

At the present time memory matrices are currently made which use toroidal magnetic cores as storage elements. The individual toroidal cores, generally formed of ferromagnetic alloys or ferrites characterized by substantially square hysteresis loops, are regularly arrayed in a frame or on a support member to provide a memory matrix. A plurality of generally mutually perpendicular conductors for pulsing or writing is threaded through the magnetic cores, and another set of conductors for sensing the magnetic state of each individual core is also threaded through the cores, generally at a 45° angle with the aforementioned conductors. Assembly of these conventional magnetic core matrices is generally accomplished by hand and has proven difficult to effectuate with simplicity, with ease and with economy.

Conversely, the present invention teaches a method of manufacturing magnetic cores and the resulting memory matrix that departs radically from the prior art methods of preparing core matrices. The first step in the invention consists in regularly and uniformly stringing insulated drive and sense conductors on a frame or jig in order to provide a regularly arrayed pattern of common cross-over points. A thin sheet of magnetic material of a type displaying the desired properties for magnetic cores is then disposed within the frame in such a way that the drive and sense conductors are substantially parallel to and in contact with the sheet of magnetic material. The next step requires that this assembly be placed in a plating solution and magnetic material be electrolytically deposited, until the conductors are completely embedded within the magnetic material. A protective or masking film of acid resistant material is applied on both surfaces of the magnetic material in register with the junctions or cros-over points of the conductors. The entire assembly is finally placed in an etching solution until the magnetic material is dissolved entirely, except only where protected by the masking material registering with the conductors' cross-over points. The matrix thus obtained is a finished article, and the frame or jig may be kept as the permanent frame or support therefor.

Plating or electrolytic depositing of magnetic material has now become a practical operation, as witnessed by the papers presented at the Symposium of the Electrodeposition Division of The Electrochemical Society (Detroit, October 1–5, 1961) and U.S. patents such as Patent Number 3,047,475, issued July 31, 1962 to Wilbur G. Hespenheide.

It is an object of this invention, therefore, to provide a new method of manufacturing magnetic core matrices.

It is a further object of this invention to provide a completed assembly convenient for immediate installation.

It is yet another object of this invention to manufacture a magnetic core matrix with efficiency and economy.

It is still another object of this invention to provide a means of manufacture of magnetic core memory matrices which lends itself to modern high production and automated industrial methods.

It is another object of this invention to avoid prior art difficulties in manufacturing similar types of magnetic core memory assemblies.

It is still another object of this invention to provide a completed magnetic core matrix sufficiently strong and rigid to withstand abuses of handling and installation thereby overcoming the delicacy characteristics of prior art matrices.

It is still a further object of the invention to provide an electrolytically deposited magnetic core matrix.

It is another object of the invention to provide a magnetic core matrix of great capacity under a considerably reduced volume as compared to the prior art matrices.

These and other objects will be more readily apparent together with the novel features of the invention when the following detailed description is considered in conjunction with the accompanying drawings, wherein.

Figure 1:
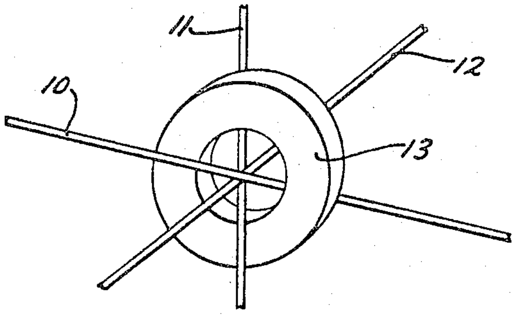
FIGURE 1 is a perspective view of a typical prior art magnetic core with drive and sense conductors.

In FIGURE 1, which is an example of a typical prior art magnetic core and associated wiring, crossing, but non-intersecting conductors, such as pulsing conductors 10 and 11 and sensing conductor 12, are shown threading through a toroidal magnetic core 13. This forms the basic element of typical memory matrices presently finding wide commercial applications. Pulsing and sensing conductors 10, 11 and 12 are substantially coplanar, with pulsing conductors 10 and 11 disposed along the X and Y axes perpendicularly to each other and sensing conductors 12 arranged at an angle of 45° to the pulsing conductors 10 and 11.

Figures 2, 4:
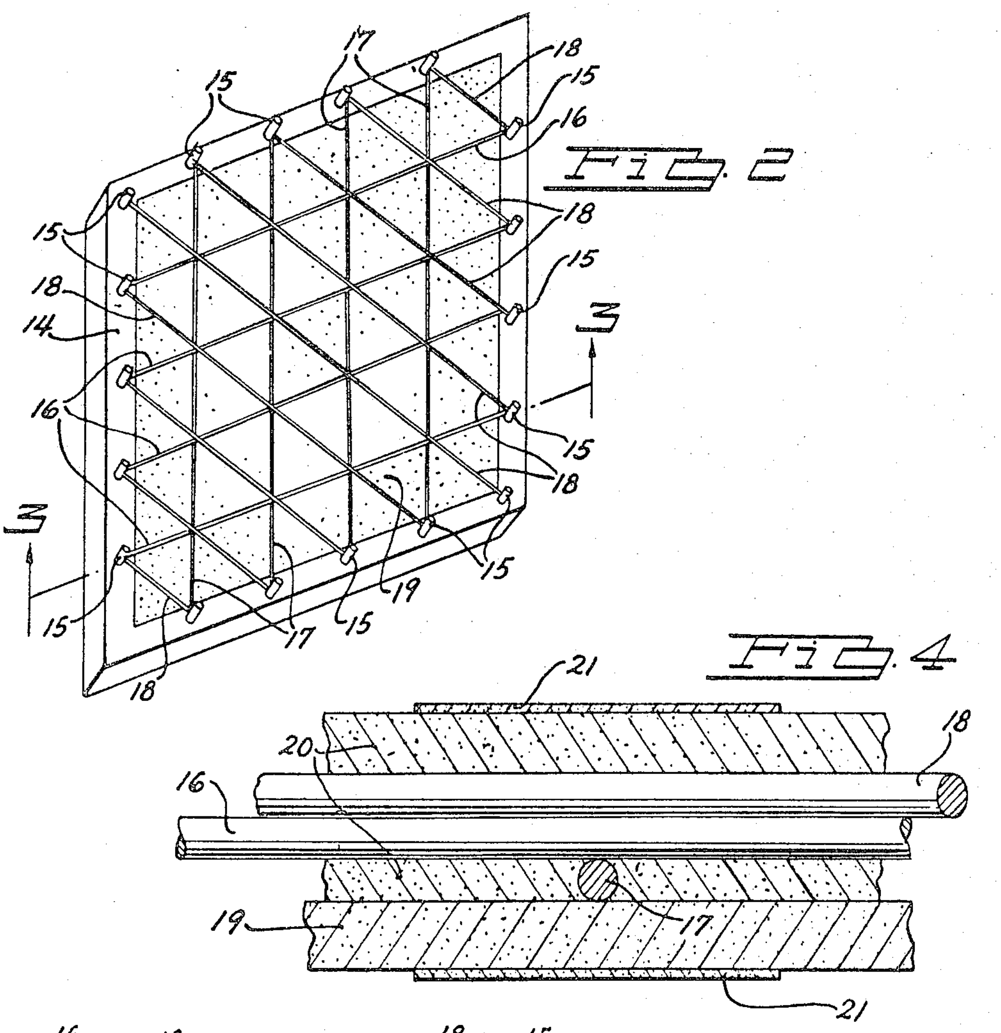
FIGURE 2 is a perspective view of a magnetic core matrix at an early step in the manufacturing process according to the invention.
FIGURE 4 is a vertical section of the assembly at a later stage and showing a typical node or conductor's cross-over point of the matrix at an enlarged scale.
Figure 3:
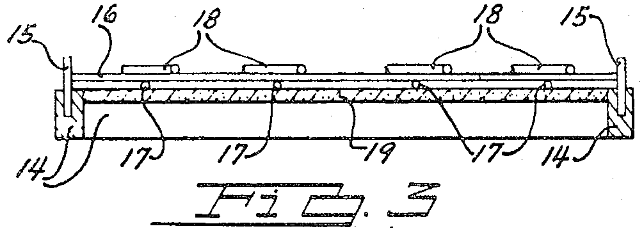
FIGURE 3 is a vertical section of the assembly taken along line 3—3 as shown in FIGURE 2, and showing the relative positions of the holding frame, sense and drive conductors and sheet of magnetic material.

Referring now to FIGURES 2 and 3, which show an early step in the manufacturing process according to the invention, a frame or jig 14, made of electrically non-conductive material, is provided with conductive pins or terminals 15 upon which are soldered or otherwise secured a plurality of insulated pulsing and sensing conductors 16, 17 and 18. Pulsing and sensing conductors 16, 17 and 18 are regularly arrayed in the position that they will ultimately occupy in the matrix. Terminals 15 may be used, in the finished magnetic core matrix, as junctions for further lead-in wires for connection to other matrices and associated electrical circuitry. Underlying the pulsing and sensing conductors 16, 17 and 18, a thin sheet of magnetic material 19 of, for example, 97% iron, 3% nickel with characteristics similar to permalloy, or any other appropriate composition, is disposed within the frame 14 in a plane generally parallel to the plane of the pulsing and sensing conductors 16, 17 and 18 and in contact with them.

The assembly is then immersed in an electrolytic bath with the sheet of magnetic material 19 connected as a cathode to the negative terminal of a D.C. source and with a block of platinum, graphite or the like, acting as an anode. The face of the sheet 19 opposite to the face in contact with the conductors is protected against plating by a thin film of wax or plastic, or the like. Sufficient magnetic material 20 is deposited on the appropriate face of sheet 19 to cover the drive and sense conductors and form a continuous and uniform mass of magnetic material completely covering the conductors.

As an example of practical application, if it is desired that a core .005 in. thick be obtained, and the diameter of the pulsing and sensing conductors 16, 17 and 18 is .0005 in., the thickness of the thin sheet of magnetic material may be in the order of .00175 in. and the thickness of the layer of additional magnetic material to be plated or electrodeposited is also in the order of .00175 in.

Examples of plating baths or electrolyte compositions may be found in U.S. Patent No. 3,047,475 and several methods for obtaining electrodeposited magnetic films were given in papers presented before the Electrochemical Society during the symposium hereinbefore referred to. Generally, typical plating baths may contain ferrous and nickelous ions in aqueous solution in their sulfamate salt state, with addition of sulfamic acid for pH control. Iron and nickel chlorides or sulfates may also be used with addition of small quantities of the appropriate acids for pH control. The concentration of iron and nickel salts in the baths may generally vary between wide limits such as being as low as 5 grams per liter to as high as 150 grams per liter.

The anode may be platinum, graphite or the like, the current density may be as low as a few milli-amperes per square centimeter to several amperes per square centimeter.

Alternately, other means of depositing a magnetic film 20 imbedding the pulsing and sensing conductors and firmly adhering to the thin magnetic sheet 19 may be used such as vacuum depositing or spraying with molten magnetic alloys. The latter method however requires that the insulation material covering the pulsing and sensing conductors be somewhat heat-proof. Also, it has been found that satisfactory magnetic core matrices may be achieved by simply spraying with magnetic paints similar to the ones used for coating magnetic tapes, drum or discs, although the binder in such magnetic paints may sometimes cause uneven results in the quality of the finished product.

Referring now to FIGURE 4, which represents at an enlarged scale a cross-sectional view of a portion of the magnetic core memory matrix at a cross-over point after plating has been completed, thin protective film portions 21, made of a "resist" material such as wax, plastic or ink, which is capable of protecting the surface of the magnetic material during the following step of etching operation, are disposed on both surfaces of the magnetic material in locations substantially corresponding to the cross-over points of the pulsing and sensing conductors 16, 17 and 18. The protective film portions may be individually applied, but, preferably, well known photographic or silk screen printing methods may be used. The protective portions may be disc-shaped or be of any other appropriate shape. Terminal pins 15 are also protected by any conventional means, such as spraying with also a "resist" material.

The whole magnetic core matrix assembly is subsequently dipped into an etching bath consisting, for example, of a diluted aqueous solution of a mineral acid such as sulphuric acid, hydrochloric acid, and the like. The assembly is maintained in the etching bath until all the magnetic material has been dissolved, except where protected by the protective film portions 21.

Figure 5:
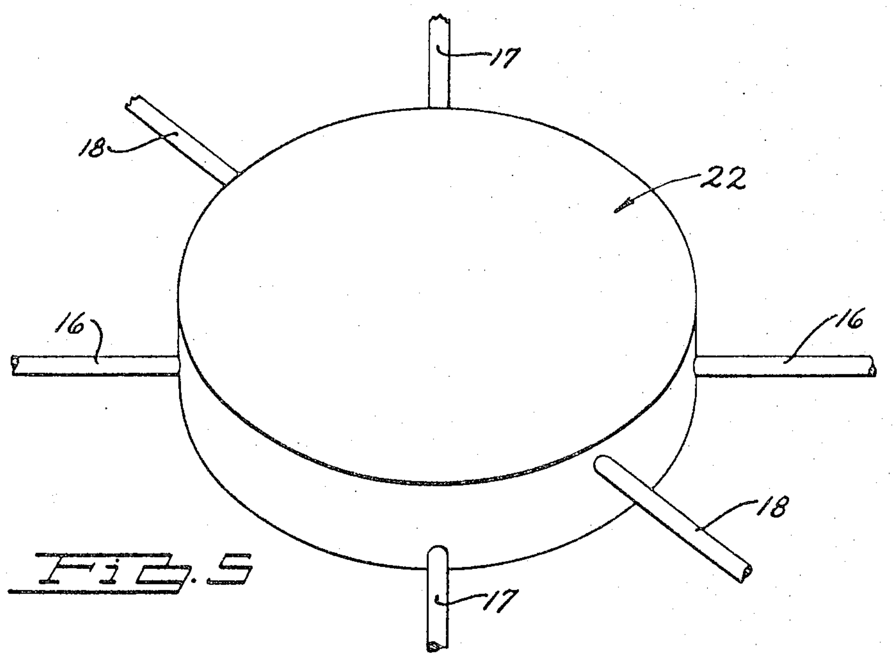
FIGURE 5 is a much enlarged perspective view of a typical magnetic core of the matrix according to the invention, shown in its completed state, for comparison with the prior art core of FIGURE 1.
Figure 6:
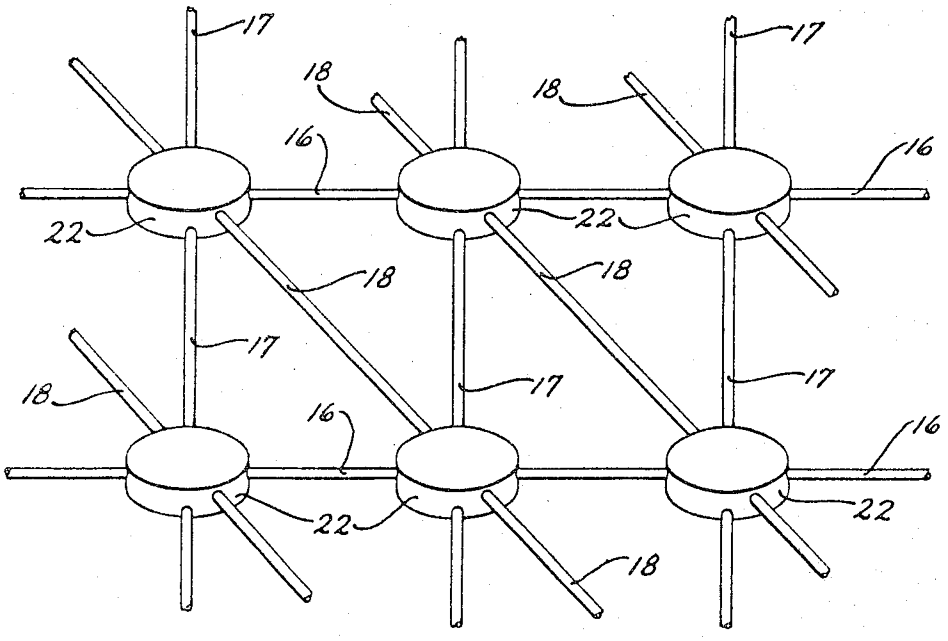
FIGURE 6 is a perspective fragmentary view of a magnetic core matrix made according to the teachings of the invention.

FIGURE 5 represents a magnetic core obtained by the process of the invention and which, for all purposes, is the electrical equivalent of the typical prior art magnetic core of FIGURE 1. A magnetic core 22, consisting of the block of magnetic material remaining after etching, imbeds one cross-over point of pulsing and sensing conductors 16, 17 and 18. The entire matrix is made of a plurality of such conductors' cross-over points with a core 22 firmly adhering thereto and imbedding the same contained within the frame 14 and now ready for installation as a component of a magnetic core memory system, as shown in FIGURE 6 representing a schematic fragmentary view of several such cores.

The magnetic core memory matrix may preferably be used as obtained, that is it may be used with the pulsing and sensing conductors attached to the terminal pins on the frame, the frame thus contributing greatly to the rigidity and sturdiness of the assembly. Alternately, the pulsing and sensing conductors may be clipped close to the terminal pins and the matrix removed from the frame and utilized without the latter.

A magnetic core memory matrix manufactured according to the teachings of the invention is capable of containing a substantial quantity of information under a considerably reduced volume as compared to previous art matrices. Each individual core may have a thickness of, for example, .005 in. and its diameter be in the order of .01 in. The cores may be spaced .005 in. apart and a matrix consisting of 64 rows of 64 cores may easily be contained within a square inch. One hundred juxtaposed and interconnected matrices would occupy a volume of one cubic inch resulting in a magnetic core memory system capable of packing 409,600 bits of information per cubic inch.

The above description is intended to serve only as an example of the invention and various alterations and minor improvements could be made by those skilled in the art without departing from the underlying principles of the invention, as expressed in the appended claims.

What is claimed as new is:

1. A process of manufacturing a magnetic core memory apparatus comprising the steps of:

disposing insulated electrical conductors along an X-axis and a Y-axis between equally spaced electrically conductive pins affixed to a 4-sided rectangular electrically non-conductive frame disposing further electrical conductors at a 45° angle with said first mentioned conductors, said last mentioned conductors being also attached to said electrically conductive pins according to a pattern of regularly and uniformly distributed X-axis, Y-axis and diagonal axis conductors crossing at regularly and uniformly distributed common coplanar cross-over contact points with one of said conductors being the lower conductor, one being the middle conductor and the remaining one being the upper conductor;

disposing a thin sheet of magnetic material within said frame on one side of said conductors and substantially parallel to and in contact with said lower conductor;

electrolytically depositing a coating of magnetic material on the conductors' side of said sheet until said conductors are completely imbedded in said coating and said coating has a thickness above said upper conductor which is substantially as thick as said sheet;

applying small disks of protective acid resistant material on both surfaces of the magnetic material, said disks being substantially concentric with the cross-over points of said conductors;

dissolving the magnetic material unprotected by said disks until all said unprotected magnetic material is completely removed from said magnetic core memory apparatus;

and arranging a plurality of thus processed frames in parallel planes with appropriate electrical connections therebetween and to and from for connecting to associated electrical equipment.

2. A process as claimed in claim 1 comprising a further step of clipping said insulated conductors proximate the pins affixed to the frame for separating said magnetic core memory apparatus from said frame.

3. A process of manufacturing a magnetic core memory matrix comprising the steps of:

uniformly arraying insulated drive and sense conductors in an electrically non-conductive frame thereby defining a plurality of substantially regularly distributed cross-over points of said conductors;

disposing a thin sheet of magnetic material within said frame on one side of said conductors and substantially parallel to and in contact with said conductors;

electrolytically depositing a thin film of magnetic material on the other side of said sheet until said conductors are completely imbedded in said film and said film thickness is substantially as thick as said sheet above said upper conductor;

applying small disks of protective acid resistant material on both surfaces of the magnetic material, said disks being substantially concentric with the cross-over points of said conductors;

and dissolving the magnetic material unprotected by said disk until all said unprotected magnetic material is completely removed from said magnetic core memory matrix.

4. The process of claim 3 wherein said disks of protective acid resistant material are applied to the surfaces of the magnetic material by a silk screen printing process.

5. The process of claim 3 wherein said disks of protective acid resistant material are applied to the surfaces of the magnetic material by a photographic process.

6. A process of manufacturing a core memory matrix comprising the steps of:

uniformly arraying insulated drive and sense conductors in an electrically non-conductive frame thereby defining a plurality of substantially regularly distributed cross-over contact points of said conductors;

disposing a thin sheet of magnetic material within said frame on one side of said conductors and substantially parallel to and in contact with said lower conductor;

electrolytically depositing a coating of magnetic material on the other side of said sheet until said conductors are completely imbedded in said coating and said coating has a thickness substantially equal to the thickness of said thin sheet of magnetic material above said upper conductor;

protecting areas on both surfaces of the magnetic material corresponding to said cross-over points;

and dissolving the unprotected magnetic material until all said unprotected magnetic material is completely removed from said core memory matrix.

7. A process of manufacturing a core memory matrix according to claim 6 comprising the further step of separating said core memory matrix from said frame.

8. A process of manufacturing a core memory matrix according to claim 6 wherein the areas on both surfaces of the magnetic material are protected by a photographic operation.

9. A process of manufacturing a core memory matrix according to claim 6 wherein the areas on both surfaces of the magnetic material are protected by a silk screen printing operation.

References Cited

UNITED STATES PATENTS

| | | | |
|---|---|---|---|
| 3,342,706 | 9/1967 | Liben et al. | 204—15 XR |
| 3,099,874 | 8/1963 | Schweizerhof | 29—604 |
| 3,218,694 | 11/1965 | Wood | 29—604 |
| 3,229,265 | 1/1966 | Brownlow et al. | |
| 3,239,822 | 3/1966 | Davis et al. | |
| 3,300,767 | 1/1967 | Davis et al. | |

JOHN F. CAMPBELL, *Primary Examiner.*

R. W. CHURCH, *Assistant Examiner.*